US006499985B1

(12) United States Patent
Sekiguchi et al.

(10) Patent No.: US 6,499,985 B1
(45) Date of Patent: Dec. 31, 2002

(54) APPARATUS FOR CHANGING A MOLD BOX FOR A CONCRETE BLOCK MOLDING MACHINE

(75) Inventors: Yoji Sekiguchi, Maebashi (JP); Hironobu Yoda, Maebashi (JP); Yoshinobu Hoshino, Maebashi (JP)

(73) Assignee: Katsura Machine Co, Ltd., Maebashi (JP)

( * ) Notice: Subject to any disclaimer, the term of this patent is extended or adjusted under 35 U.S.C. 154(b) by 0 days.

(21) Appl. No.: 09/443,457

(22) Filed: Nov. 19, 1999

(30) Foreign Application Priority Data

Nov. 19, 1998 (JP) .......................................... 10-329507

(51) Int. Cl.[7] ............................ B28B 3/04; B29C 33/30

(52) U.S. Cl. ........................ 425/186; 425/193; 425/195

(58) Field of Search ................................ 425/186, 193, 425/195

(56) References Cited

U.S. PATENT DOCUMENTS 4,150,931 A * 4/1979 Gabrys ....................... 425/186
4,555,228 A * 11/1985 Nishiike et al. ............ 425/186
4,795,334 A * 1/1989 Kitahara ..................... 425/186
5,002,711 A * 3/1991 Iwama et al. ............... 425/186
5,419,694 A * 5/1995 Yonezawa et al. .......... 425/186
5,445,508 A * 8/1995 Kubo et al. ................. 425/186
5,580,587 A * 12/1996 Leonhartsberger et al. . 425/186
5,952,015 A * 9/1999 DeWyre et al. ............. 425/186

FOREIGN PATENT DOCUMENTS

JP 3-18161 4/1991

* cited by examiner

*Primary Examiner*—James P. Mackey
(74) *Attorney, Agent, or Firm*—Crowell & Moring LLP

(57) ABSTRACT

A mold box changing apparatus for a concrete block molding machine has a roller type mold box feed line, a split female/male thread type attaching/detaching device constituting a tightening mechanism has a lockable rotary support shaft actuated by a cylinder. The tightening mechanism includes a rotary support shaft capable of rotation by a cylinder pierced into a plunger extending downward from the press. A male thread portion has a split engagement groove disposed at a lower end of the rotary support shaft. The male thread portion has an end face in the form of a first inclination surface cam. A female thread portion has a split engagement groove and provided with a second inclination surface cam corresponding to the first inclination surface cam of said male thread portion such that rotation of said rotary support shaft causes the first inclination surface cam to be contacted, under pressure, with the second inclination surface cam.

3 Claims, 9 Drawing Sheets

APPARATUS FOR CHANGING A MOLD BOX FOR A CONCRETE BLOCK MOLDING MACHINE

BACKGROUND OF THE INVENTION

This invention relates to a mold box changing method for a concrete block molding machine used for automatically changing a mold box for shaping or forming concrete blocks. The present invention provides a method and an apparatus for changing a mold box for a concrete block molding machine.

Heretofore, there has been known a method for changing a mold box consisting of a plunger (male mold) and a mold (female mold) which mold box is used for shaping concrete blocks. Until recently, it was an ordinary practice that the plunger and the mold are merely suspended in their separated states and carried in a predetermined location in those states. Then, a worker(s) fixes the plunger and the mold directly to the machine body by tightening bolts and nuts or by suitable other means at appropriate spots. An inconvenience associated this practice is that the mold box itself is extremely heavy (for example, one set of the plunger and mold weighs about 400 to 600 kg.) and therefore, time and labor consuming work is required for changing the mold box and in addition, this type of work often involves danger. For this reason, power saving was recently demanded for the mold box changing work. In line with this demand, there was proposed an auxiliary apparatus for attaching such a mold box, as disclosed, for example, in Japanese Utility Model Publication No. 3-18161, which was previously filed by the present applicant. In this auxiliary apparatus, at least a mold box-to-be-changed (hereinafter simply called as the "changeable mold box") or replaced with a new one is once retained by a support arm disposed on a machine body, the changeable mold box is then loaded on a carriage travelling on a rail laid in this side of the machine body and then it is mechanically fed to outside the machine body. However, this apparatus still has such a shortcoming that for changing the changeable mold box with a new mold box on the carriage, the changeable mold box is once discharged by a separate hoisting mechanism at an outlet position and thereafter, a new mold box is separately lowered, by a manual operation, to load on the carriage in a suspended fashion. That is, the carriage itself is moved by the action of the cylinder and the action of the auxiliary apparatus (support arm) is operatively connected to an elevating table which is elevated upward by a cylinder so as to support the mold box automatically. However, a plunger composing a part of the mold box and a press which is elevated downward from an upper location of the machine body must be carried out manually by tightening a bolt in a conventional manner.

In this way, the carriage itself is self-traveled by an electric motor or by the action of the cylinder, and the support arm of the auxiliary apparatus is rotationally projected inward by movement of said carriage through an operatively connecting mechanism, thereby automatically supporting a side surface of the mold box which is elevated upward by a receiver. On the other hand, however, the attachment work of the plunger located at an upper location of the mold box to a lower surface of the press within the machine body is made by a manual operation, that is, by manually tightening the bolt in the conventional manner. Moreover, the most serious problem involved is that the attachment work of the plunger (in one pair of female and male component elements composing the mold box) located in the upper location to the press is not yet automatically made and therefore, the worker is obliged to creep into the narrow interior of the molding machine every time the attachment work is required and manually tighten the bolt. Since this work is not only troublesome but also quite risky, it is demanded that the changing work of the mold box be made completely automatically.

It is most desirable that the work for separating the changeable mold box composed of a plunger and a mold from the machine body, releasing the support of the support arm, loading the mold box on the carriage, discharging the mold box from the carriage, and at the outside of the machine body, loading a new mold box in the place of the changeable mold box on the carriage is all made automatically in a consecutive manner.

In the appearance of so-called color blocks which are currently in fashion in view of their fancy appearance, a proper quantity of color material and common concrete material (base material) is filled into two material feed hoppers as a process for molding such color blocks. For molding blocks of a wide variety of kinds each in a small quantity of production as currently increasingly required, mold boxes prepared in conformity with the configurations of such blocks are required to be changed frequently (for example, about 10 to 15 times a day). Early realization of shortening of the time for changing the mold box and creation of an automatic mold box changing apparatus having reliable safety means are keenly demanded.

The present invention has been accomplished in view of the above.

SUMMARY OF THE INVENTION

It is, therefore, a general object of the present invention to provide a mold box changing method for a concrete block molding machine and an apparatus for carrying out the method, capable of obviating the shortcomings inherent in the prior art.

To achieve the above object, from one aspect of the present invention, there is essentially provided a mold box changing method for a concrete block molding machine comprising the steps of:

holding a new mold box, composed mainly of a female type mold and a male type plunger, in a standby position on an inlet path portion at one end of a linear type mold box feed line disposed in parallel to a concrete block molding machine body;

receiving an old mold box-to-be-changed, composed of a female type mold and a male type plunger, the old mold box being separable after use at the concrete block molding machine body, by a receiver;

loading the old mold box on a frame-like carriage located on an orthogonal feed path portion;

the orthogonal feed path being branched at a mid-way of the mold box feed line having a distal end located underneath the concrete block molding machine body, moving backward the carriage until the old mold box-to-be-changed is brought to a branch path portion of the mold box feed line;

pushing and discharging the old mold box-to-be-changed to an outlet path portion disposed forwardly of the mold box feed line by being pushed by a side surface of a new mold wherein the new mold is pushed and moved by a pusher held in a standby position at one end of the mold box feed line;

loading the new mold box for taking the place of the old mold-box-to-be-changed on the carriage;

elevating upward the carriage with the new mold box loaded thereon to a predetermined location by an elevator-type receiver after the carriage arrives at underneath the concrete block molding machine body;

supporting the mold of the new mold box in the elevated position by a mold support extending from sideways thereof; and locking a corner portion of the plunger engaged with the mold by a cylinder type split female/male thread type detaching/attaching device having a rotary support shaft extending downward from a press, said press being elevated downward from an upper location of the concrete block molding machine body, whereby the mold and plunger of the new mold box are held in vertically separated relation.

From another aspect of the present invention, there is also provided a mold box changing apparatus for a concrete block molding machine comprising:

a roller type mold box feed line spacedly disposed in parallel relation with respect to the concrete block molding machine, one end of the mold box feed line being defined as an inlet path portion on which a self-travelling type pusher is disposed, an intermediate portion thereof being defined as a branch path on which a self-travelling rail type orthogonal feed path whose a distal end is located underneath the concrete block molding machine body, and the other end thereof being defined as an outlet path portion;

a lifter disposed within a space between opposing rails at a basal end of the orthogonal feed path portion where the branch path portion is located and adapted to bring the mold box-to-be-changed or the new mold box loaded on the carriage into conformity with a feed plane of the mold box feed line or a plane of the carriage;

a cylinder type receiver disposed in a space between opposing rails at a distal end of the orthogonal feed path portion and adapted to elevate upward and downward the mold box loaded on the carriage between a predetermined first position and a predetermined second position;

mold supports disposed along opposite sides of the receiver in a back and forth direction and adapted to retain a lower surface of the mold box by a support arm of a rotary shaft supported on the concrete block molding machine body; and a split female/male thread type attaching/detaching device pierced into a plunger projecting from a lower surface of a press which lower surface is located on an upper side of the concrete block molding machine body, the attaching/detaching device having a lockable rotary support shaft actuated by a cylinder, the mold box-to-be-changed composed of a plunger and a mold being delivered, after use at the concrete block molding machine body, to the branch path portion of the mold box feed line by the carriage, the used mold box-to-be-changed being automatically discharged from the carriage at the branch path portion and a new mold box for taking the place of the used mold box-to-be-changed being automatically loaded on the carriage.

In the structure described above, each of the mold supports can feed support arms projecting from at least four rotary shafts which are supported in their upstanding postures on the machine body at both outer sides of the receiver to a lower surface of the mold which has been elevated upward by a receiver operatively connected to movement of the carriage.

Further, the split female/male thread type attaching/detaching device constitutes a tightening mechanism which includes a rotary support shaft capable of rotation by a cylinder pierced into the plunger extending downward from the press, a male thread portion having a split engagement groove being disposed at a lower end of the rotary support shaft, an end face of the male thread portion being in the form of an inclination surface cam, a female thread portion having a split engagement groove and provided with an inclination surface cam corresponding to the inclination surface cam of the male thread portion being disposed at the plunger, so that a rotation of the rotary support shaft will cause the first-mentioned inclination surface cam to be contacted, under pressure, with the second-mentioned inclination surface cam.

The lifter may include a link mechanism, which is slidingly moved by the cylinder, and a rail portion having rolls disposed at an upper location of the link mechanism and directing towards the mold box feed line.

As described above, since the orthogonal feed portion for allowing the carriage to travel thereon extends underneath the molding machine body is in the form of a branch path formed at a mid-way of the roller type mold box feed line laid in parallel relation to the machine body, as a preliminary preparation, a new mold box is delivered to and placed in a standby position at one end of the mold box feed line and then, a rear end of the new mold box is connected to the self-travelling type pusher.

For changing the changeable mold box used for shaping a predetermined block, the rotary support shaft projecting from the plunger attached to the press located at the upper location of the machine body is rotated a predetermined angle by the cylinder of the detaching device disposed on the press through a lever. This causes the male thread portion having the split engagement groove and disposed at a lower end of the rotary support shaft pierced into the plunger to rotate to slidingly move this inclination surface cam and the inclination surface cam of the female thread portion having the split engagement groove and disposed on the plunger with respect to each other. And the rotary support shaft comes off (detachment) at the position where a projection and a recess formed on the two split engagement grooves are in conformity with each other. The plunger brought away from the press is engaged with the mold located thereunder, thus forming the changeable mold box.

The changeable mold box thus formed is once slightly floated from the mold support by upward elevation of the cylinder type receiver. Thereafter, the carriage self-travelling on the orthogonal feed portion is advanced. The rotary shaft of the mold support operatively connected to the carriage causes the support arm outward to release its support of the changeable mold box. In that state, the receiver is elevated further downward and the changeable mold box is loaded on the carriage currently located underneath the machine body.

Then, the carriage is moved backward until it reaches the branch path portion of the mold box feed line. When the carriage reaches the branch path portion, the pusher behind the new mold box held in the standby position on one side of the mold box feed line is advanced to the branch path portion where the changeable mold box is pushed by the side surface of the new mold box and discharged towards the front outlet path portion. And the new mold box in the place of the changeable old mold box is loaded on the carriage.

At the branch path portion, the plane of the carriage and the feed plane of the mold box feed line are stepped (i.e., not even). Therefore, when the changeable mold box loaded on the carriage is brought to the branch path portion, the parallel lifter disposed in the branch path portion is actuated to cause the rail portion having the rolls disposed on its upper surface to elevate upward so as to be flush with the feed plane of the mold box feed line. After the new mold box in the place of the changeable mold box is brought to the rail portion having the rolls, the lifter is slightly elevated downward to load the new mold box on the carriage.

Thereafter, the carriage is advanced to underneath the machine body. When the carriage is brought to a predetermined position, the front edge of the carriage contacts an operating element of the mold support thereby rotating the rotary shaft. As a consequence, the support arm projecting from the rotary shaft is opened (escaped) outward to facilitate a smooth upward elevation of the new mold box. When the carriage reaches right above the receiver, the receiver is caused to elevate upward between the rails by the action of the cylinder located at a lower location and the new mold box loaded on the carriage is brought up to a predetermined location. When the carriage is moved backward, the operating element of the mold support is restored under the effect of a spring in operative connection with the backward movement of the carriage, thereby swinging the support arm of the rotary shaft inward. Therefore, the support arm is brought to the lower surface on both sides of the new mold box to support the new mold box. Even after the receiver is retracted downward, the new mold box is held in the predetermined location.

When the new mold box is set in place, the press located at the upper location of the machine body is elevated downward. As a consequence, the male thread portion formed on the lower end of the rotary support shaft of the attaching/detaching device projecting from the lower surface of the press is engaged with the split engagement groove of the female thread portion formed on the plunger which is nested in the upper location of the new mold box, through the projection and recess formed on the male thread portion of the rotary support shaft. In that state, the cylinder on the side of the press is actuated to move the lower portion of the rod so that the lever portion of the rotary support shaft is rotated a predetermined angle. As a consequence, the rotary support shaft integral with the lever potion is also rotated to cause the inclination surface cam of the male thread portion at the lower end thereof to slidingly move on the inclination surface cam of the female thread portion and firmly fixed in the form of wedge tightening.

Finally, the press is elevated upward. By doing so, the work for the attachment of the mold box is completed in which the mold and the plunger are separated in an upper and a lower location of the machine body.

DETAILED DESCRIPTION OF THE EMBODIMENTS

Figure 1:
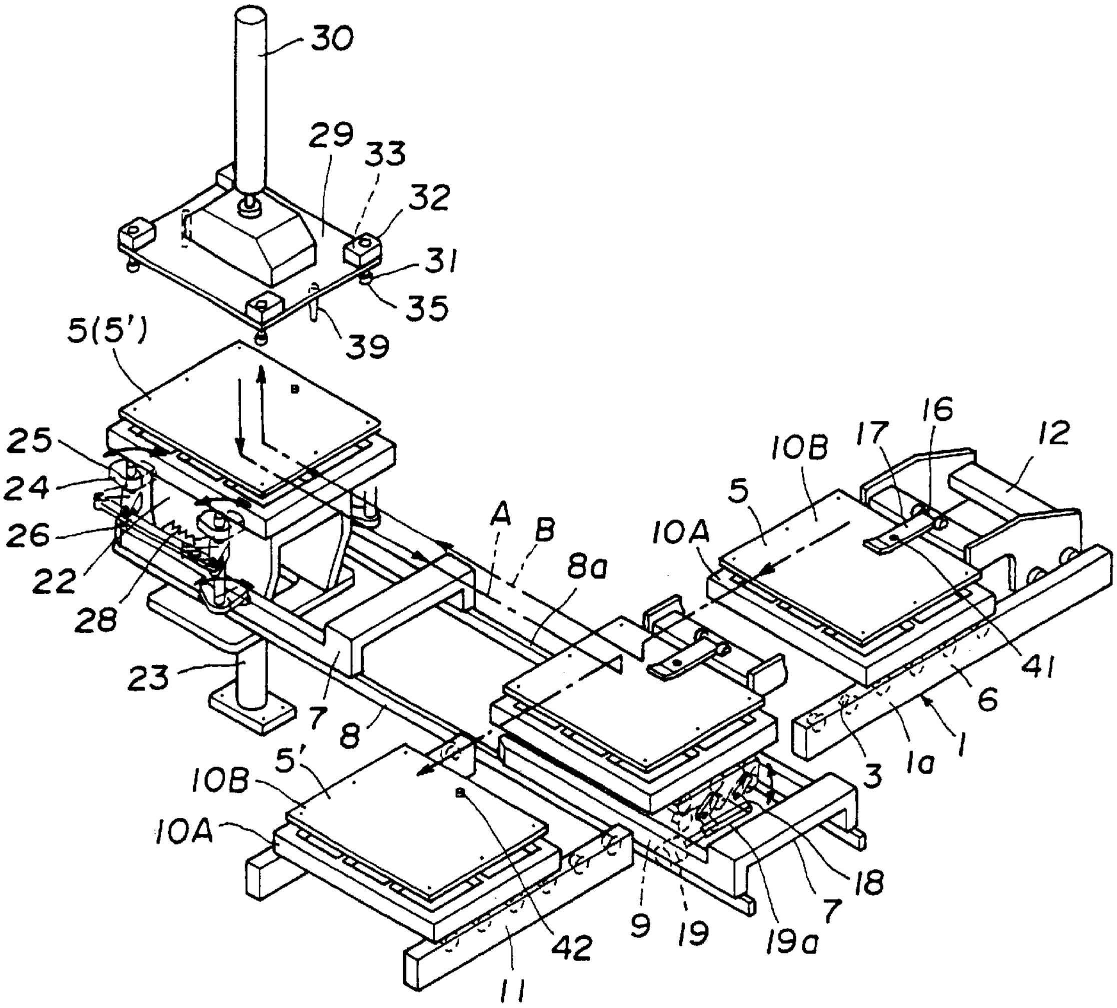
FIG. 1 is a schematic perspective view showing an apparatus for carrying out a mold box changing method for a concrete block molding machine, according to an embodiment of the present invention.
Figure 2:
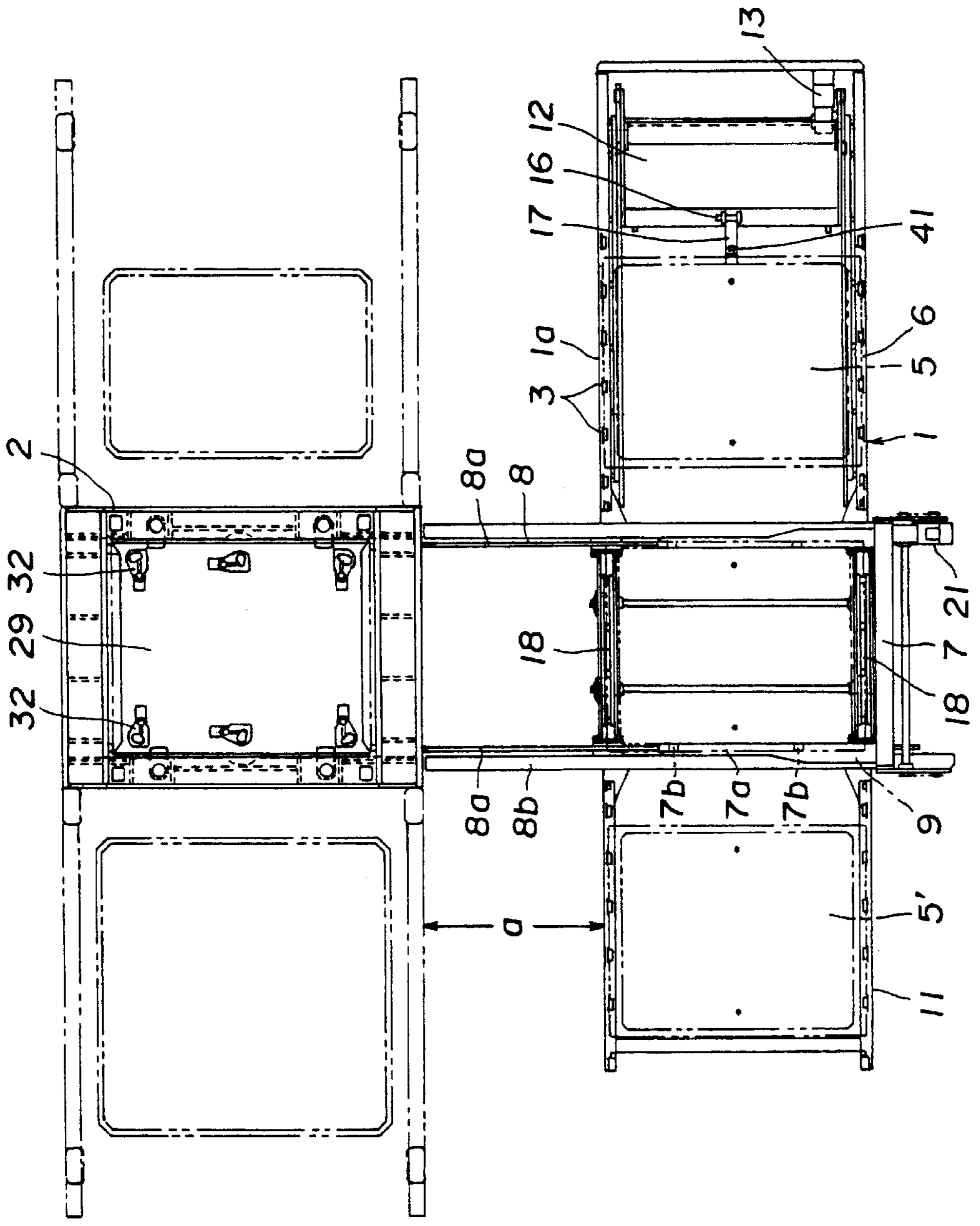
FIG. 2 is a plan view of the mold box changing apparatus, which is shown in FIG. 1.
Figure 3:
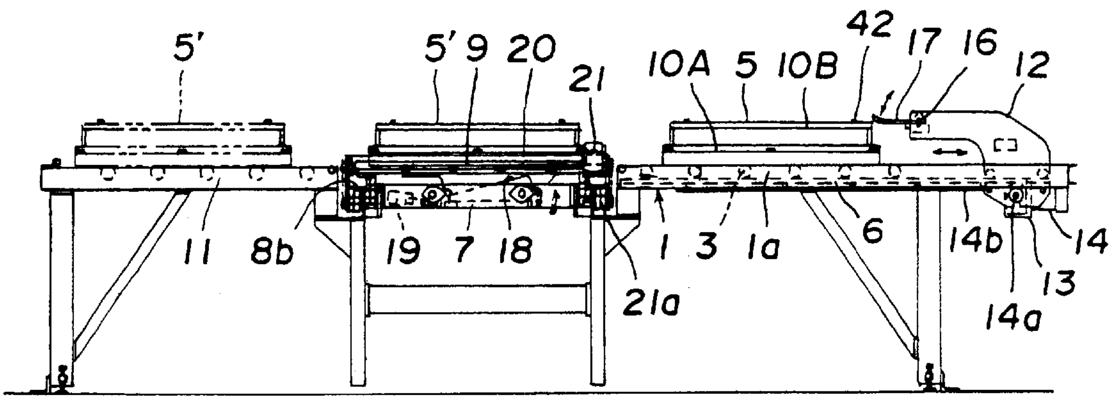
FIG. 3 is a front view of the mold box changing apparatus shown in FIG. 1, but when viewed in a direction of a mold box feed line side.
Figure 4:
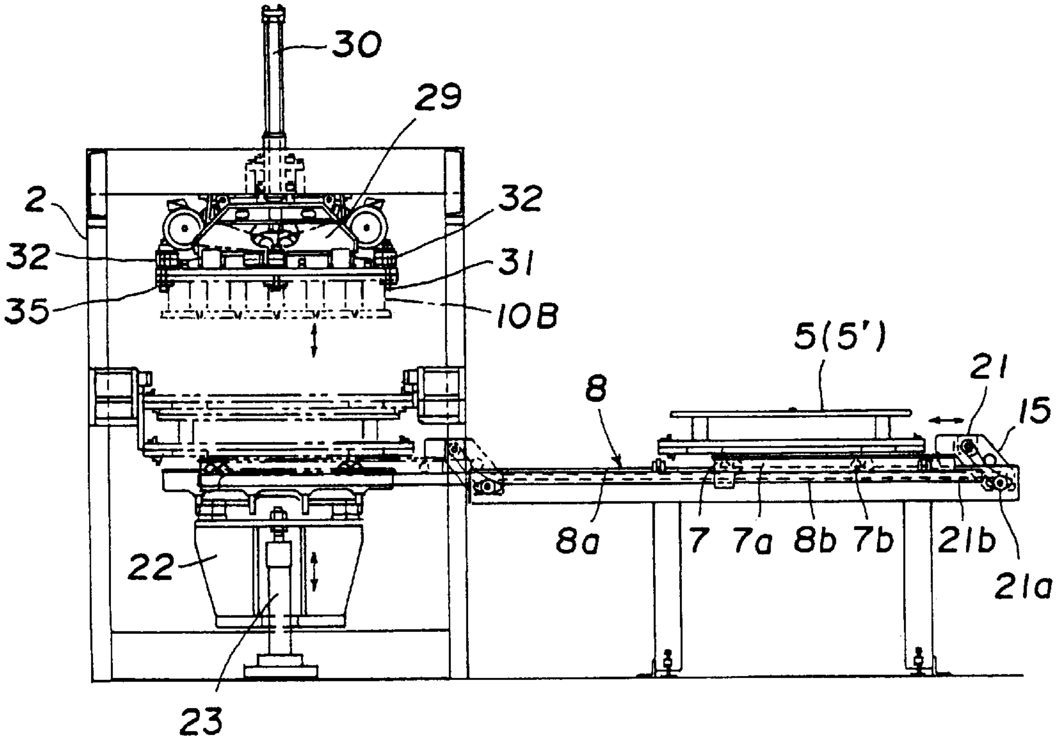
FIG. 4 is a side view showing the concrete block molding machine and an orthogonal feed path portion.

A mold box changing method for a concrete block molding machine according to the present invention will now be described hereinafter with reference the accompanying drawing, which also shows an apparatus for carrying out the method.

Referring first to FIGS. 1 to 5 showing an embodiment of a mold box changing apparatus which is to be set up on a concrete block molding machine for shaping a concrete blocks, a roller type mold box feed line 1 is disposed on this side of a concrete block molding machine body 2 and includes a pair of opposing rail frame portions 1*a* and flanged rollers 3 arranged in parallel relation on the rail frame portions 1*a* at predetermined spaces a. This mold box feed line 1 is in the form of a linear path. The linear mold box feed line 1 is of a split construction, in which one end of the mold box feed line 1 is defined as an inlet path portion 6 on which the new mold box 5 is placed and which serves as a standby section, an intermediate portion thereof is defined as a branch path 9 on which a basal portion of a rail type orthogonal feed path portion 8 is located, a distal end of the feed path portion 8 being located underneath the molding machine b, and the other end thereof is defined as an outlet path portion 11 to which a changeable mold box 5' is pushed out. A self-travelling frame-like carriage 7 is disposed on the feed path portion 8. The new mold box 5 and the changeable, old mold box 5' themselves are in the form of a split mold box, in which a lower end portion thereof is composed of a female type mold 10A and an upper end portion is composed of a male type plunger 10B which is engageable with the female type mold 10A. A new mold box pusher 12 is disposed on a basal end portion of the inlet path portion 6. The pusher 12 is provided with a drive mechanism serving as a self-travelling means 13, in which a pinion 14*a* rotated by a motor 14 is meshed with a rail side rack 14*b*. The pusher 12 is further provided, on a front upper edge thereof, with a mold box locking hook 17, which is rotatable about a pin 16. Lifters 18 are disposed within a space between opposing rails at the basal portion of the orthogonal feed path portion 8 in a split path of the branch path 9. The lifters 18 are each in the form of a rail frame, in which each lifter 18 is connected at lower ends of parallel link portions 18*a* which are pivotally attached at their centers to a machine frame to a slide shaft 19*a* which is fed by a cylinder 19 and in which a rail portion 20 having rolls 20*a* attached thereto and directing in a longitudinal direction of the mold box feed line 1 is disposed in a horizontal fashion on an upper portion of the link portion 18*a*.

The self-travelling means 15 of the frame-like carriage 7 includes a frame-like carriage body 7*a* having wheels 7*b* arranged on a lower surface thereof which wheels 7*b* are travelable on opposing rails 8*a* of the orthogonal feed path portion 8. The frame-like carriage body 7*a* is provided on a rear end thereof with a pinion 21*a* rotatable by a motor 21. The pinion 21*a* are in mesh with a rack 21*b* disposed on a lower surface of a feed frame portion 8*b* which is disposed in parallel relation to the rails 8*a*.

A receiver 22 is disposed between the frames of the opposing rails 8*a* of the orthogonal feed path portion 8 at a location underneath the machine body 2 and the receiver 22 is elevated upward and downward by a vertical cylinder 23. Mold supports 24 are disposed along opposite sides of the receiver 22 in a back and forth direction. The mold supports 24 each includes at least two rotary shafts 24*a* forming one pair on the machine body side which rotary shafts 24*a* are supported by the mold supports 24 in their upstanding postures. Further, the mold supports 24 each includes cam-like support arms formed on upper portions of the respective shafts 24*a* in their laterally projecting postures, link-like connecting rods 26 connected to intermediate portions of the respective shafts 24*a,* and an operating arm 27 disposed on a lower end of that shaft 24*a* which is located on this side in the drawing. A restoring spring 28, which is locked to the machine body side, is attached to one end of each connecting rod 26.

Figure 15:
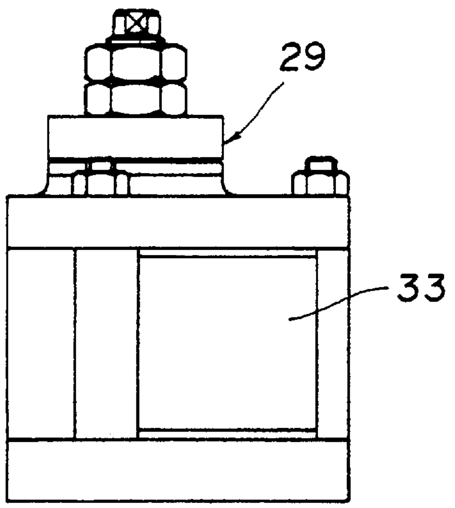
FIG. 15 is a side view of the split female/male thread type attaching/detaching device shown in FIG. 13.
Figure 16A:
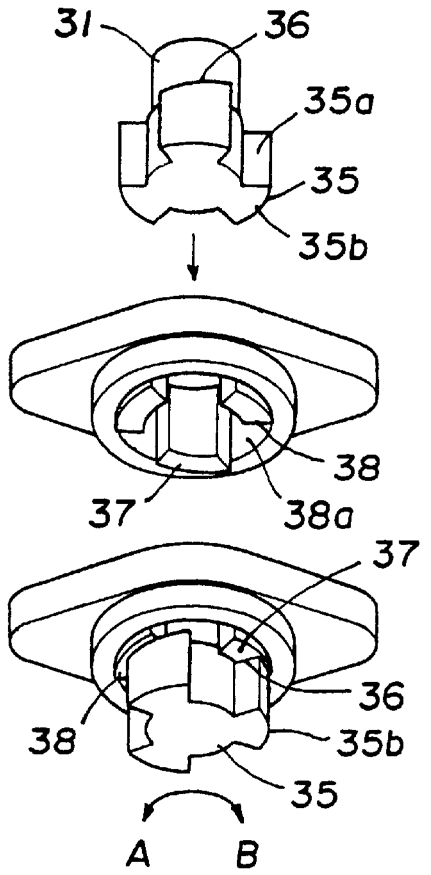
FIGS. 16(A) and 16(B) are an explanatory perspective view and a side view, respectively, of the attaching/detaching device, showing the state, in which the split male thread portion and the split female thread portion are detached and separated from each other.
Figure 16B:
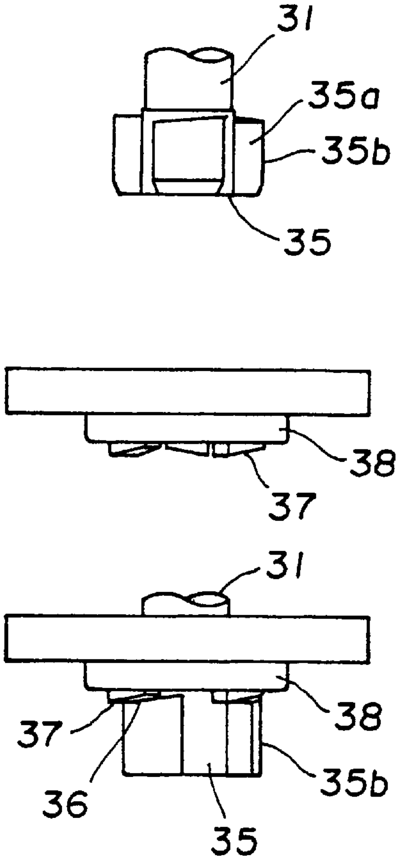

In FIGS. 15, 16(A) and 16(B), a press 29 can be elevated upward and downward by a vertical type cylinder 30 located at an upper location of the machine body 2. The press 29 is provided in at least four locations thereof with a split female/male thread type attaching/detaching device 32 each having a rotary support shaft 31 pierced into the plunger side. The construction of this split female/male thread type attaching/detaching device 32 is such that a rod 33*a* disposed at the press 29 in its horizontal posture is connected to a lever 34 laterally projecting from the rotary support shaft 31 extending downward from the press 29, and a lower end portion of the rotary support shaft 31 is provided with a male thread portion 35 having a split engagement groove 35*a* which is split into three sections, the male thread portion 35 being provided at an upper end face thereof with an inclination surface cam 36. Further, the attaching/detaching device 32 has an inclination surface cam 37 which is in sliding contact with the inclination surface cam 36 and disposed at a female thread portion 38 having a split engagement groove 38*a* disposed at a corner portion of the plunger 10B. At the location where the split engagement groove 38*a* of the female thread portion 38 is in conformity with a split engagement projection 35*b* of the rotary support shaft 31, the rotary support shaft 31 is allowed to pierce therethrough. Thus, when the rotary support shaft 31 is rotated a predetermined angle (for example, 60 degrees) in the direction represented by "A" of a double-headed arrow in FIG. 16(A), the inclination surface cam 36 and the inclination surface cam 37 are slidingly contacted with each other, thereby realizing a kind of quick coupler. In FIG. 16(A), reference character "B" represents a rotational direction for disengagement or releasing the coupling. Sufficient number of the split female/male thread type attaching/detaching devices 32 depend on the size of the mold box. For example, in the case where the mold box is small, four split female/male thread type attaching/detaching devices are provided at four corners and in the case where the mold box is large, six attaching/detaching devices are provided, three at each of the left and right opposing sides.

Figure 5:
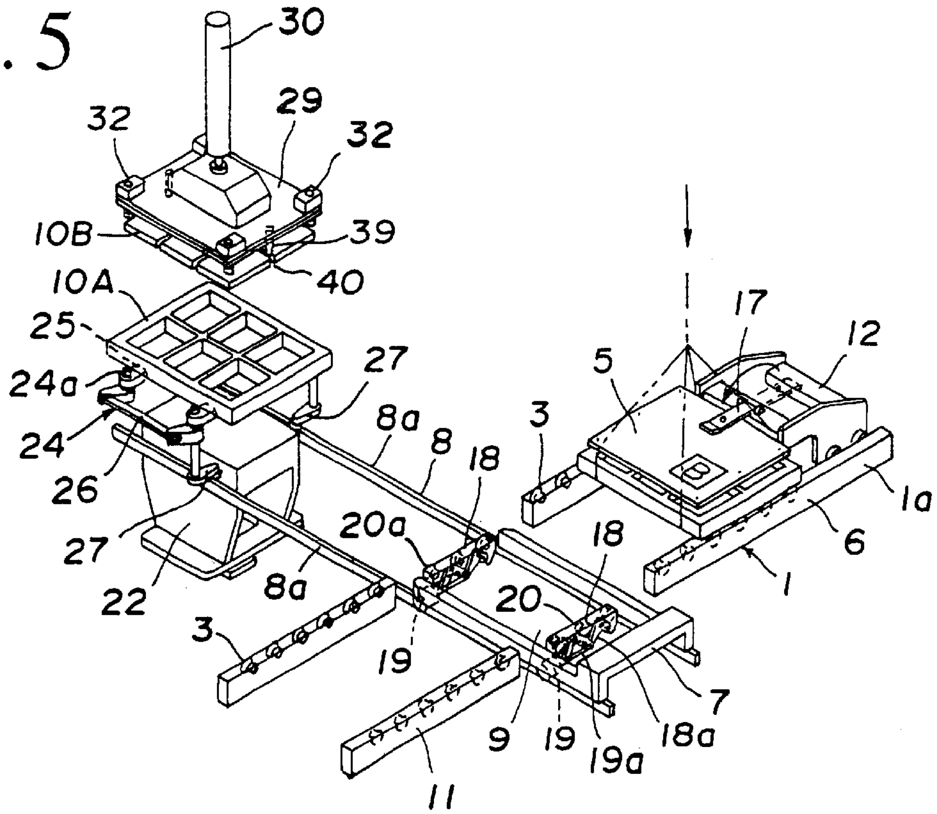
FIG. 5 is an explanatory perspective view showing the state, in which a new mold box is brought into a standby section of the mold box feed line.

In FIGS. 1 and 5, a plurality of positioning pins 39 are provided projecting from a lower surface of the press 29. Each projecting pin 39 exhibits a tapered configuration gradually reduced in diameter towards a lower end thereof. They are guided by corresponding retaining grooves 40 formed in an upper surface of the plunger 10B.

Operation of the apparatus:

Operation will now be described. Referring first to FIG. 1, as a preliminary preparation for changing the mold box (changing the changeable mold box with a new mold box), the new mold box 5 is preliminarily suspended in a proper manner by a separate trolley rail or the like and placed for standby on that area of the inlet path portion 6 which forms one end portion of the mold box feed line 1 (see FIG. 5). At that time, the hook 17 on the distal end of the pusher 12 disposed at the basal end portion of the inlet path portion 6 is held in its sprung-up state. The hook 17 is fallen forward after the new mold box 5 is placed on the inlet path portion 6 and a lock hole 41 formed in the forward end of the hook 17 is brought into engagement with a lock pin 42 disposed on an upper surface (plunger 10B) of the new mold box 5.

Figure 6:
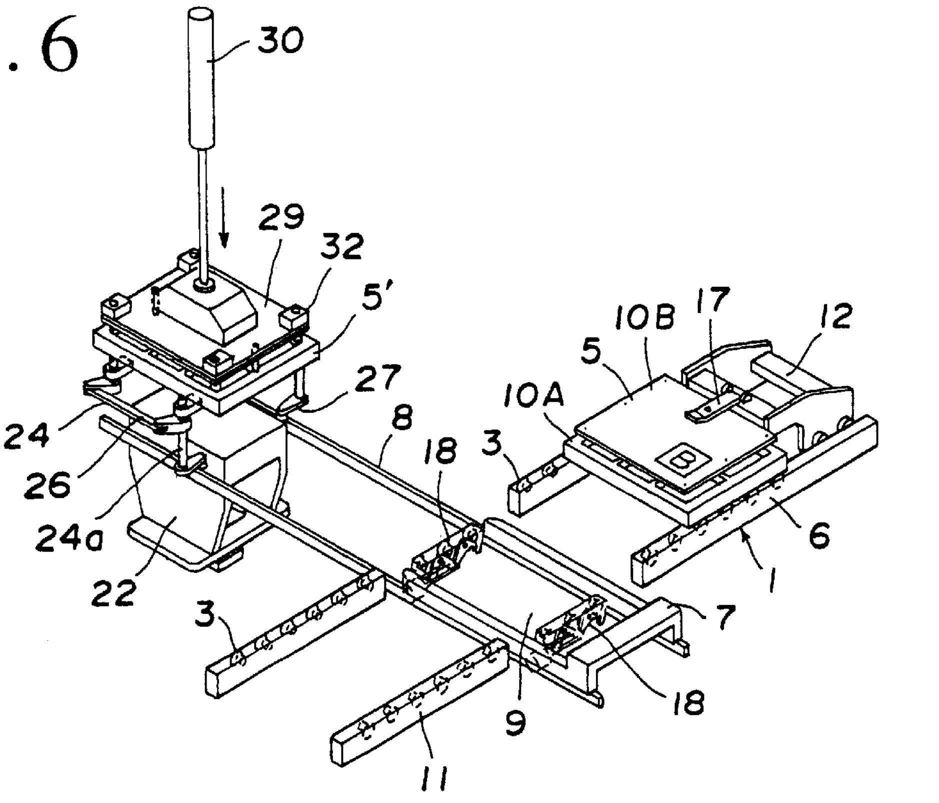
FIG. 6 is an explanatory perspective view showing the state, in which a press of the concrete block molding machine body and a plunger are separated from each other.

When a predetermined number of blocks have been shaped and the mold box (changeable, mold box 5') is to be changed with the new mold box 5 in the machine body 2, a separating work (or detaching work) of the changeable mold box 5' is carried out (see FIG. 6). First, when a predetermined operating button (not shown) is pressed, the aforementioned attaching/detaching devices 32 are actuated, which are disposed, for example, at the corner portions of the press 29 located at the upper location of the machine body 2 attached with the plunger 10B constituting a part of the changeable mold box 5'.

Figure 14:
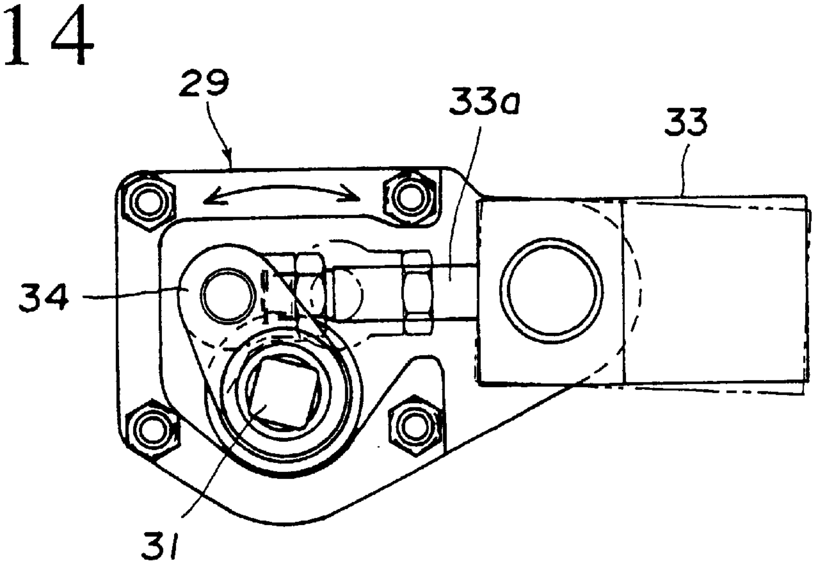
FIG. 14 is a plan view of the split female/male thread type attaching/detaching device shown in FIG. 13.

Specifically, the cylinder 33 of the attaching/detaching device is actuated to feed the rod 33*a* (see FIG. 14) and the lever 34 projecting from the rotary support shaft 31 connected to an end of the rod 33*a* is rotated in a releasing direction (that is, in the leftward direction in FIG. 14 as indicated by an arrow). This causes the rotary support shaft 31 to rotate 60 degrees in the example shown in FIG. 14. As a result, the male thread portion 35 at the lower end portion of the rotary support shaft 31 piercing through the plunger 10B is also rotated to offset the inclination surface cam 36 at the end face of the male thread portion 35 in a releasing direction, thereby loosening the surface contact with the opposing inclination surface cam 37 of the female thread portion 38 of the plunger 10B. At the same time, the location of the longitudinal split engagement projection 35*b* of the male thread portion 35 is brought in conformity with the split engagement groove 38*a* of the female thread portion 38. Therefore, the rotary support shaft 31 and the plunger 10B are disengaged from each other. When the vertical type cylinder 30 located at the upper location of the machine body 2 is elevated upward, the press 29 is retracted upward and the rotary support shaft 31 comes off the plunger 10B.

Figure 7:
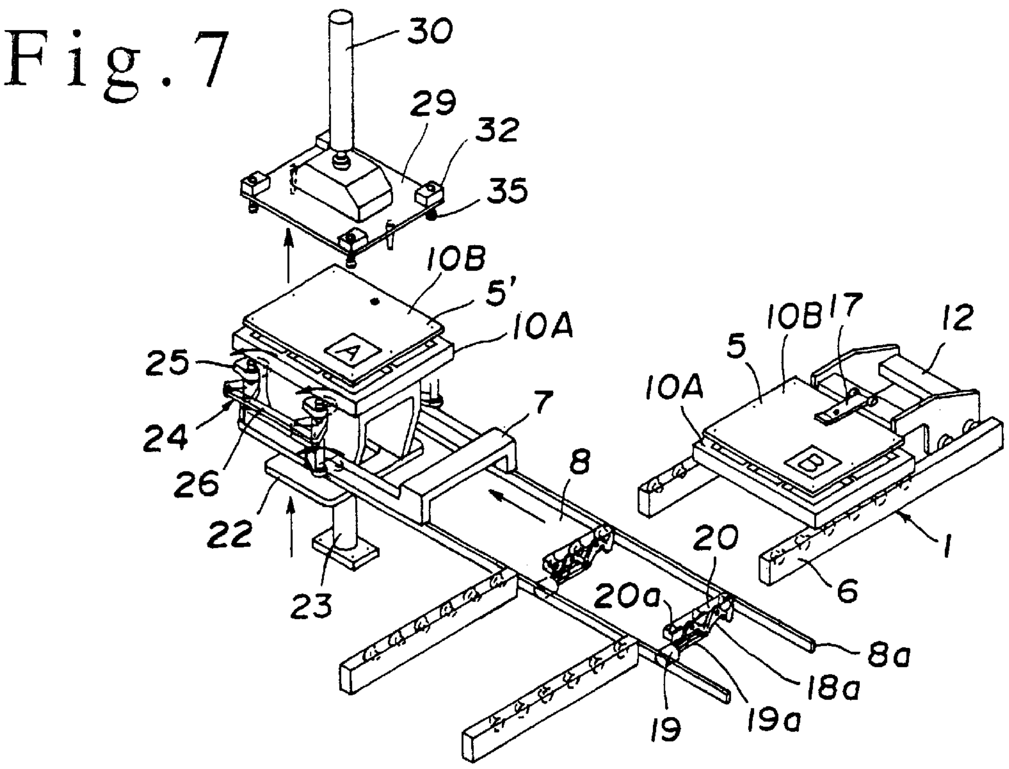
FIG. 7 is an explanatory perspective view showing the state, in which the press is raised and moved backward and then a changeable, old mold box is received by a receiver.

Then, the receiver 22 is elevated upward by the actuation of the cylinder 23 and spoons up the changeable mold box 5' composed of the mold 10A and the plunger 10B so as to float the changeable mold box 5'. Subsequently, the empty carriage 7 is caused to advance by bringing the pinion 21*a* rotated by actuation of the motor 21 which is disposed at the basal end portion through a proper transmitting mechanism into engagement with the rack 21*b* disposed at a lower surface of the feed frame portion 8*b*. When the operating arm 27 of the mold support 24 is pushed and opened outwardly by a front edge of the carriage 7, the support arm 25 projecting inwardly through the rotary shaft 24*a* integral with the operating arm 27 is rotated outwardly, thereby releasing the support with respect to the changeable mold box 5' (see FIG. 7). Thereafter, the receiver 22 is elevated downward and returned to the standby position underneath the rail 8*a* of the orthogonal feed path portion 8. Then, the changeable mold box 5' once retained by the receiver 22 is loaded on the carriage 7.

Figure 8:
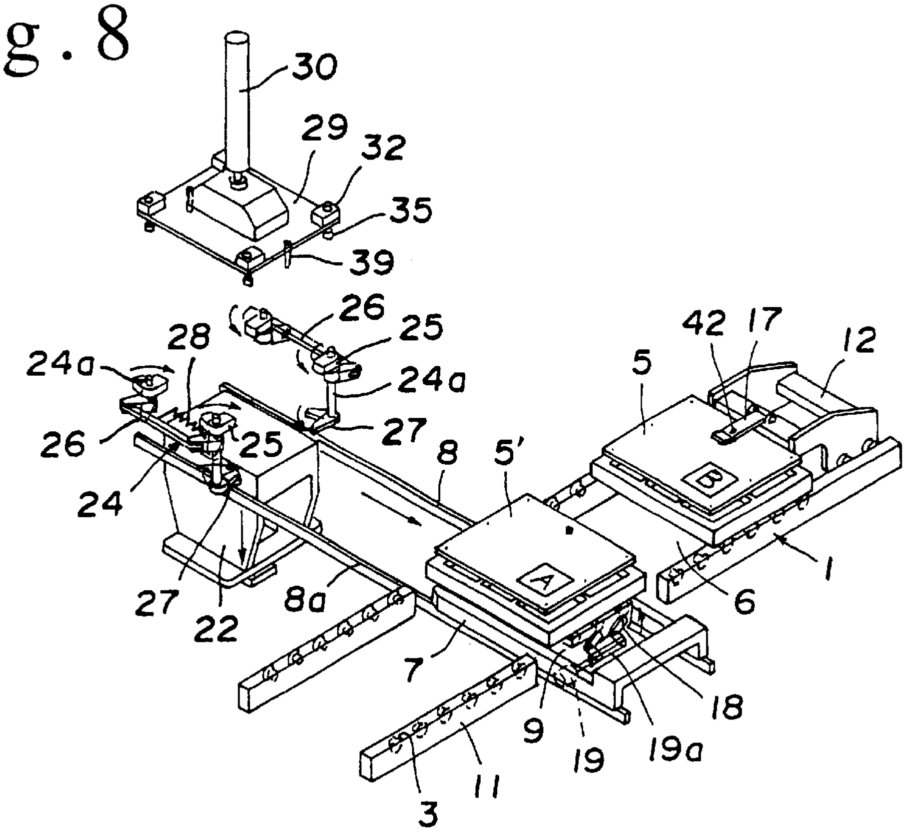
FIG. 8 is an explanatory perspective view showing the state, in which a carriage loaded with the changeable old mold box is moved backward to a branch path portion of the mold box feed line.
Figure 9:
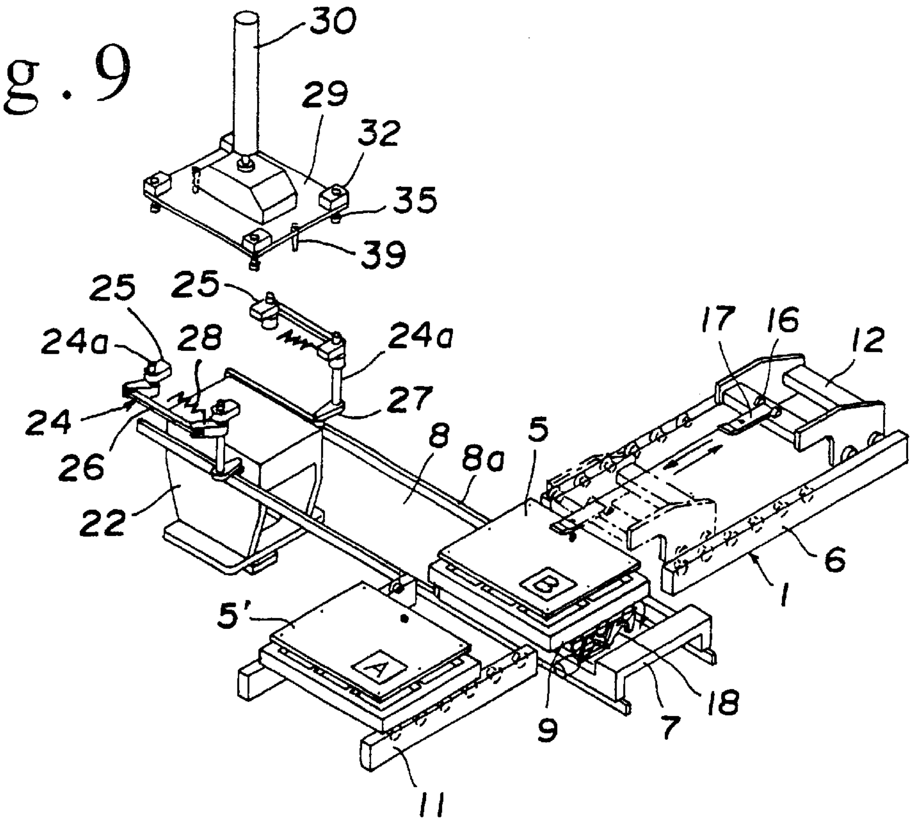
FIG. 9 is an explanatory perspective view showing the state, in which at the branch path portion, a lifter on the carriage is raised, then the changeable mold box is pushed towards an outlet path portion and a new mold box for taking the place of the changeable mold box is loaded on the carriage.

Then, the carriage 7 loaded thereon with the changeable mold box 5' is moved backward and stopped at that area of the mold box feed line 1 where the branch path portion 9 is located (see FIG. 8). At that time, since the changeable mold box on the carriage 7 is in a one-step lower location than the feed plane of the mold box feed line 1, the lifter 18 is rotated in parallel about a fulcrum 18*b* of the link portion 18*a* by actuation of the cylinder 19 so that the rail portion 20 is flush with the feed plane of the mold box feed line 1 (see the arrow of FIG. 1). Thereafter, the pusher 12 connected to a rear end of the new mold box 5 preliminarily placed in the standby position of the mold box feed line 1 is advanced by the actuation of the motor 13. Then, the new mold box 5 pushed by the pusher 12 is slidingly moved on the flanged rollers 3 arranged on the feed plane and reaches the branch path portion 9. Then, the changeable mold box 5' located at the branch path portion 9 is pushed by the side surface of the advancing new mold box 5 and slidingly moved on the rolls 20*a* of the rail portion 20 of the lifter 18 so as to be discharged towards the front outlet path portion 11. And the new mold box 5 for taking the place of the changeable mold box 5' is loaded on the lifter 18 (see the mold box feed line A of FIGS. 9 and 1).

When the lifter 18 loaded thereon with the new mold box 5 is slightly elevated downward in a reverse manner, the new mold box 5 is set to the carriage 7 which is held in the standby position immediate thereunder. This downward movement of the new mold box 5 causes the lock pin 42 on the rear end portion of the new mold box 5 to disengage from the lock hole 41 of the hook 17 of the pusher 12, thereby allowing the pusher 12 to return to the initial basal end of the mold box feed one 1. On the other hand, the carriage 7 loaded thereon with the new mold box 5 advances on the orthogonal feed path portion 8 branched from the mold box feed line 1 and reaches underneath the machine body 2.

Figure 10:
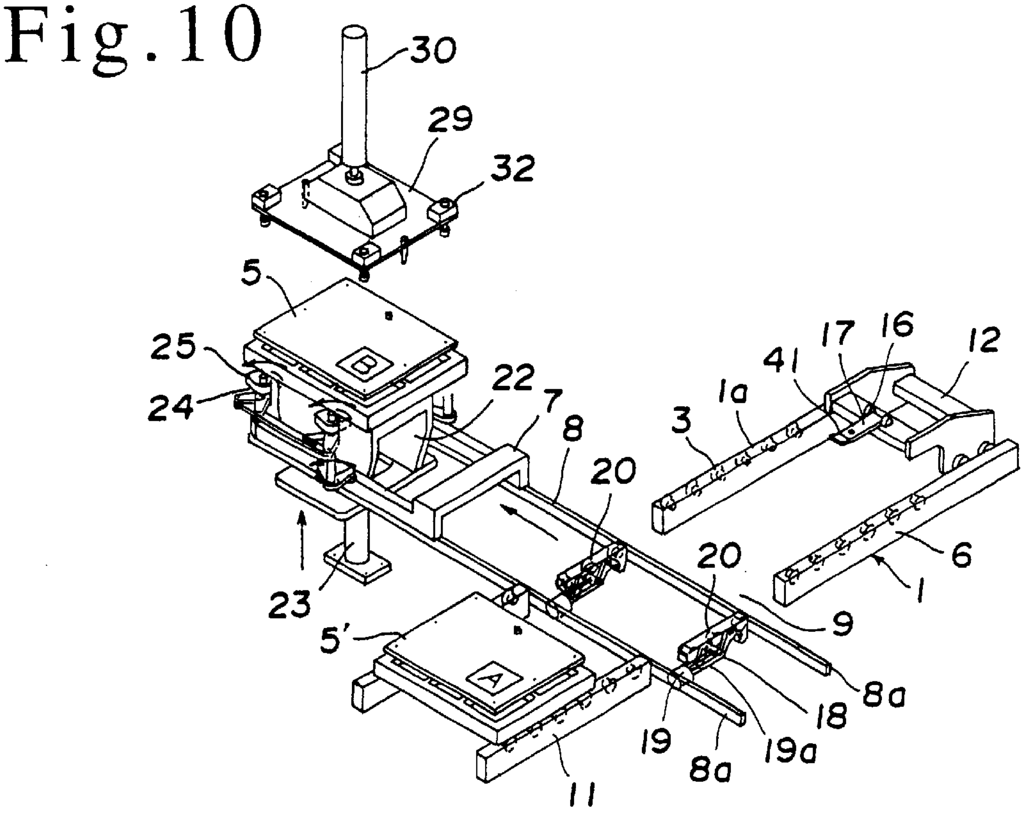
FIG. 10 is an explanatory perspective view showing the state, in which the new mold box is fed to underneath the concrete block molding machine body and then raised to a predetermined location by a feed receiver.

When the carriage 7 loaded thereon with the new mold box 5 reaches underneath the machine body 2, the front edge of the carriage 7 pushes the operating arm 27 of the mold support 24 so as to be rotated outwardly, thereby outwardly opening (escaping) the support arm 25 located at the upper location through the rotary shaft 24*a* integral with the operating arm 27. Thereafter, the receiver 22 located at a lower location between the rails of the orthogonal feed path portion 8 is elevated upward to lift the new mold box 5 loaded on the frame-like carriage 7 up to a predetermined location (see FIG. 10). In that state, when the carriage 7 is moved backward, the support arm 25, which is opened outwardly by the carriage 7, is rotated back to the original support position under the effect of the restoring spring 28. When the receiver 22 is elevated downward, the lower surface of the new mold box 5 on the two sides thereof, which lower surface is retained by the receiver 22, is supported by the support arm 25 of the mold support 24 (see the mold box feed line B of FIG. 1).

Figure 11:
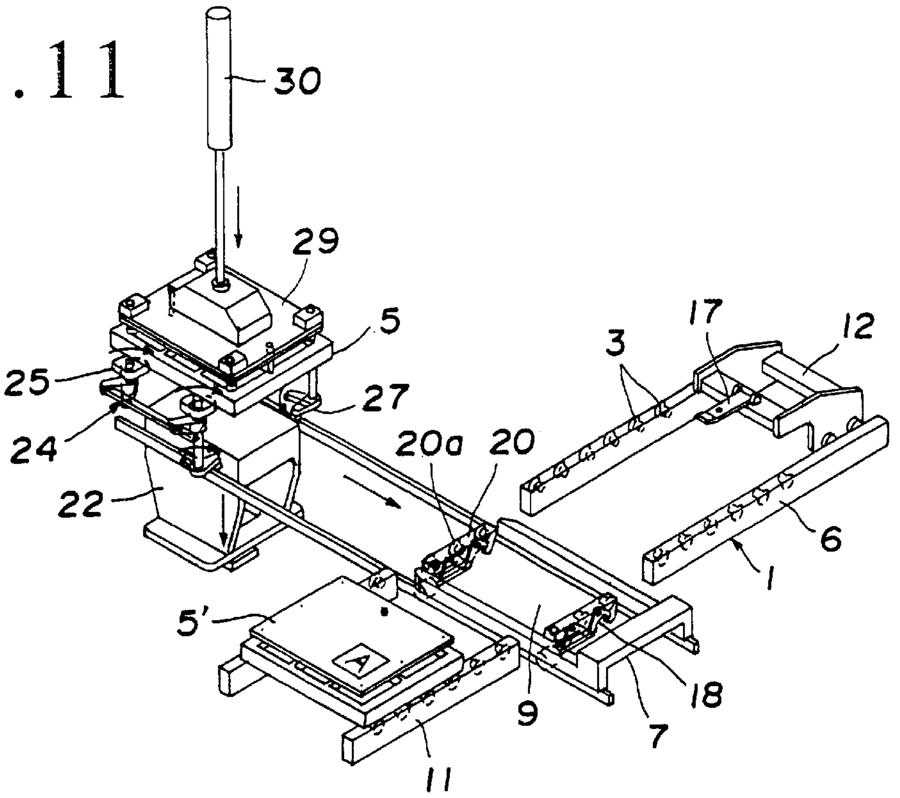
FIG. 11 is an explanatory perspective view showing the state, in which the plunger of the new mold box supported by a mold support is attached to the press.

After the new mold box 5 is elevated upward and supported by the mold support 24, the press 29 located at the upper location of the machine body 2 is elevated downward again by the actuation of the cylinder 30 and the rotary support shaft 31 of the split female/male thread attaching/detaching device 32 projecting from the lower surface of the press 29 is inserted into an attachment hole 44 of the plunger 10B (see FIG. 11). When the press 29 approaches the plunger 10B, first, the rather long positioning pin 39 projecting towards the press 29 is guided to the retaining groove 40 disposed at a confronting area of the plunger 10B and positioned. Therefore, the rotary support arm 31 is positively pierced into the attachment hole 44 of the plunger 10B.

Figure 12:
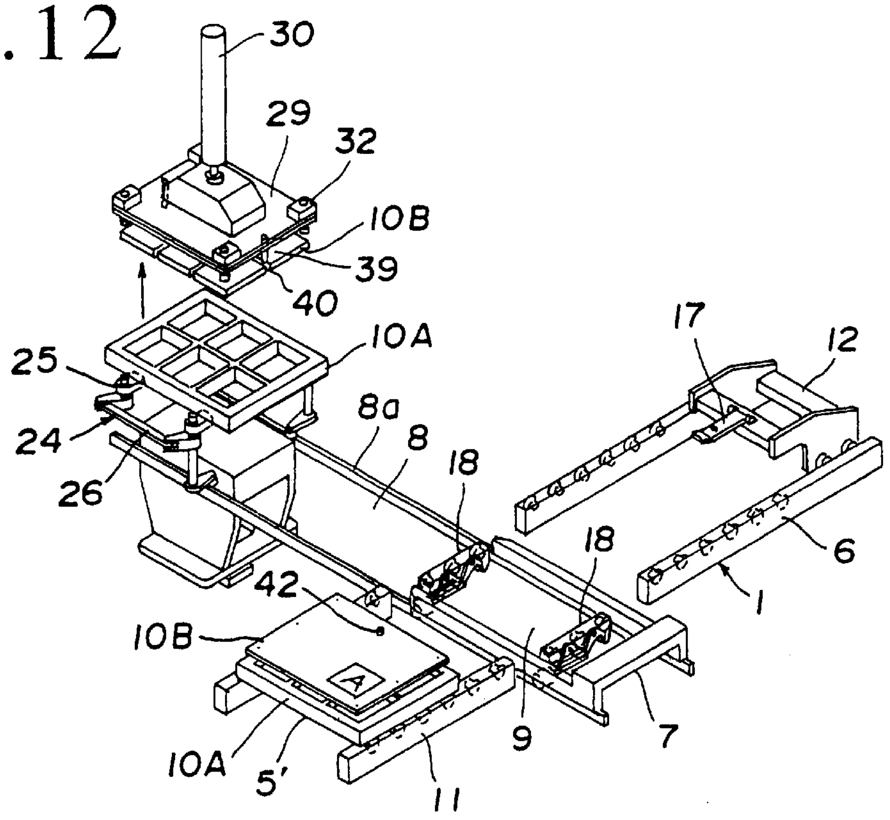
FIG. 12 is an explanatory perspective view showing the state, in which an empty carriage is moved backward through the orthogonal feed path portion and brought to the branch path portion of the mold box feed line.
Figure 13:
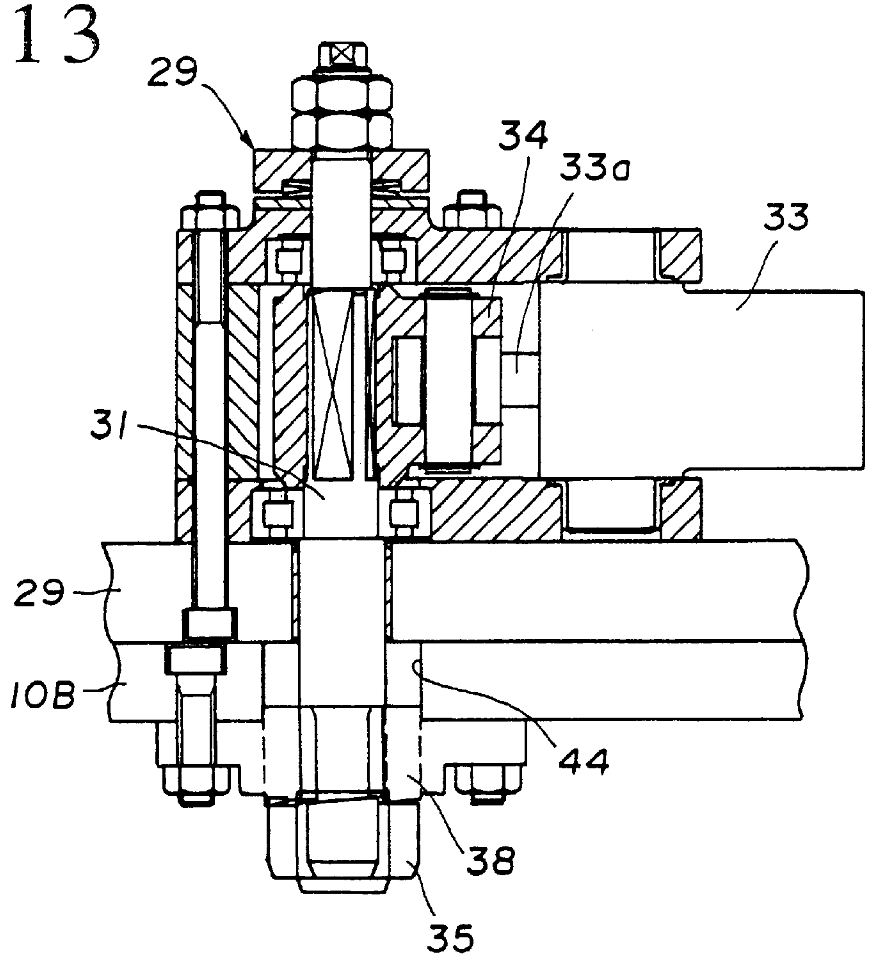
FIG. 13 is a sectional view of an essential portion of a split female/male thread type attaching/detaching device.

Finally, the attaching/detaching device 32 disposed at the press 29 is actuated to contract the rod 33*a* of the cylinder 33. By doing so, the rotary support shaft 31 is rotated a predetermined angle (60 degrees) through the lever 34. Therefore, the inclination surface cam 36 at the end face of the male thread portion 35 of the lower end portion of the rotary support shaft 31 is offset in the tightening direction in a reverse manner and brought into contact, under pressure, with the confronting inclination surface cam 37 of the female thread portion 38 of the plunger 10B. At the same time, the split engagement projection 35*b* of the male thread portion 35 is offset from the split engagement groove 38*a* of the female thread portion 38, thereby providing a kind of coupler locking. That is, the plunger 10B is attached to the press 29. Thereafter, when the press 29 is properly elevated upward, the plunger 10B comes off the mold 10A. Thus, the new mold box 5 is attached to the machine body 2 in their vertically divided postures (see FIG. 12).

Thereafter, the operation for shaping a block may be performed by properly operating the machine body 2 and through the known working process. It should be noted that the changeable mold box 5' moved to the outlet path portion 11 of the mold box feed line 1 may be properly suspended during the block shaping operation and discharged to a place for storage by separate means. Another new mold box 50 to be used next is held in a standby position of the inlet path portion 6.

As described hereinbefore, in the mold box changing method and apparatus for a concrete block molding machine according to the present invention, the mold box feed line disposed parallel to the machine body is provided at a midway thereof with an orthogonal feed path portion, as a branch path portion, extending to underneath the machine body. One end of the mold box feed line is defined as an inlet path portion having a pusher, where a new mold box is held in a standby position. A distal end of the branch path portion is defined as an outlet path portion. A new mold box is preliminarily held in a standby position of the inlet path portion. After the completion of the block shaping operation, the plunger constituting a part of the changeable mold box set in a predetermined molding place is automatically separated by releasing the pressure contact between the inclination surface cam of the split male thread portion and the inclination surface cam of the split female thread portion by means of the split female/male thread type attaching/detaching device through rotation of the rotary support shaft which is made by the actuation of the cylinder. The changeable mold box separated from the press is lowered by the receiver. Then, the changeable mold box is automatically loaded on the carriage waiting on the orthogonal feed path portion and delivered to the branch path portion. At this branch path portion, the changeable mold box is pushed by a new mold box and automatically discharged to the outlet path portion. Accordingly, even in the case where a heavy mold box (a combination of a mold and a plunger) is to be used, the mold box can be changed simply, reliably and rapidly.

Moreover, the attachment device of the press with respect to the plunger has a so-called rapid coupling mechanism in which the split male thread portion at a lower end of the rotary support shaft actuated by the cylinder and the split female thread portion of the plunger are positionally matched with each other and the two inclination surface cams thereof are contacted, under pressure, with each other. Accordingly, the automatic attaching and detaching work can be performed by one-touch or fingertip operation. Thus, it is no more required for the worker to enter the narrow interior of the machine body and perform the attaching/detaching work manually, safety and workability are enhanced.

The feed path portion for delivering the changeable mold box leading from the machine body is faced with the branch path portion disposed at a mid-way of the mold box feed line which is parallel to the machine body and the changeable mold box is automatically changed with the new mold box by pushing operation at the location of the carriage on th branch path portion. Accordingly, a reliable changing operation is ensured, a minimum length of feed line is good enough for achieving the object of the present invention, and thus, the apparatus can be made compact.

Since the handling of the delivered changeable mold box after use and the new mold box to be carried in is, of course, an extra work having nothing to do with the block shaping work, an efficient block shaping work can be expected.

What is claimed is:

1. A mold box changing apparatus for a concrete block molding machine, comprising:

a roller mold box feed line spacedly disposed parallel to the concrete block molding machine, a lifter configured to bring a mold box-to-be-changed or a new mold box loadable on a carriage into alignment with a feed plane of the mold box feed line or a plane of the carriage;

a receiver disposed between opposing rails at a distal end of a feed path portion orthogonal to the mold box feed line and arranged to elevate upward and downward the mold box loaded on the carriage between a predetermined first position and a predetermined second position;

mold supports disposed at front and back opposite sides of the receiver and arranged to retain a lower surface of the mold box by a rotary shaft support arm supported on a body of the concrete block molding machine; and a press having a split female/male thread attaching/detaching device projecting from a lower surface of the press for connecting a mold box plunger to the press, which lower surface is located on one side of the concrete block molding machine body, the attaching/detaching device having cylinder-actuated lockable rotary support shaft wherein said split female/male thread attaching/detaching device comprises a tightening mechanism, which includes a rotary support shaft extending downward from said press, a male thread portion having a split engagement groove being disposed at a lower end of said rotary support shaft, said male thread portion having an end face configured in a first inclination surface cam, a female thread portion on said plunger having a split engagement groove and provided with a second inclination surface cam corresponding to said first inclination surface cam of said male thread portion such that rotation of said rotary support shaft causes the first inclination surface cam to be contacted, under pressure, with the second inclination surface cam.

2. A mold box changing apparatus for a concrete block molding machine according to claim 1, wherein each of said mold supports have support arms projecting from vertically-oriented rotary shafts which are operatively connected to movement of said carriage.

3. A mold box changing apparatus for a concrete block molding machine according to claim 1, wherein said lifter includes a slidingly moveable mechanism, and a rail portion having rolls in a direction of said mold box feed line.

* * * * *